United States Patent

[11] 3,634,658

[72] Inventor Richard R. Brown
New Brighton, Minn.
[21] Appl. No. 20,953
[22] Filed Mar. 19, 1970
[45] Patented Jan. 11, 1972
[73] Assignee Sperry Rand Corporation
New York, N.Y.

[54] PARALLEL BIT COUNTER

2 Claims, 6 Drawing Figs.

[52] U.S. Cl. 235/92 LG, 235/92 R, 235/92 CV, 235/92 MC, 235/173, 307/216
[51] Int. Cl. H03k 21/12
[50] Field of Search 235/92 MC, 92 LG, 92 CV, 173; 307/216

[56] References Cited

UNITED STATES PATENTS

| | | | |
|---|---|---|---|
| 3,371,195 | 2/1968 | Bolt | 235/173 |
| 3,427,445 | 2/1969 | Dailey | 307/216 |
| 3,508,033 | 4/1970 | Turecki | 235/92 R |

*Primary Examiner*—Daryl W. Cook
*Assistant Examiner*—Robert F. Gnuse
*Attorneys*—Kenneth T. Grace, Thomas J. Nikolai and John P. Dority

ABSTRACT: A counter that generates the binary coded sum of a number of equally weighted parallel input bits. The counter is constructed of a plurality of similar building block circuits and OR circuits; each building block circuit has first and second inputs and generates as first and second outputs the EXCLUSIVE OR function and the logical product, respectively, of the two inputs. Counters of $2^n$ bits (where $n$ is a positive integer equal to or greater than 2) may be constructed.

INVENTOR
RICHARD R. BROWN
BY Kenneth S Grace
ATTORNEY

PARALLEL BIT COUNTER

BACKGROUND OF THE INVENTION

The present invention relates to binary counters for digital systems in which a number of unweighted input bits are converted to a number of weighted output bits in a binary coded sum. Binary counters are typically serial counters comprising a shift register in which each of the serial string of bits that is to be counted causes the weighted stages of the shift register to assume binary conditions that represent the weighted binary coded sum of the number of bits counted—see text "Electronic Digital Techniques," Kintner, McGraw-Hill, 1968. Such serial counters must necessarily wait until the last input bit of the serial string of bits is counted before the final count is available.

SUMMARY OF THE INVENTION

The present invention is directed toward a parallel binary counter. The counter consists of a plurality of similar logic circuits; a building block circuit that generates as outputs the EXCLUSIVE OR function and the logical product of two input bits, and a logical OR circuit. Four building block circuits and one OR circuit are intercoupled to form a four-bit counter from which, along with additional building block circuits and OR circuits, counters of $2^n$-bits (where *n* is a positive integer equal to or greater than 2) may be constructed. The resulting counter is a one-bit-time parallel counter providing as output bits the weighted binary coded sum of the number of unweighted input bits.

DESCRIPTION OF THE PREFERRED EMBODIMENTS

Figure 1:
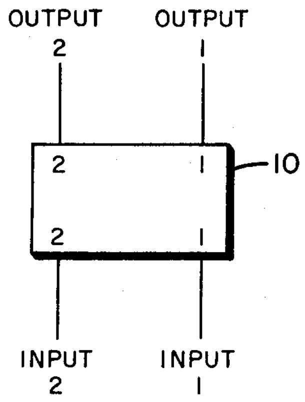
FIG. 1 is a block diagram of a basic building block circuit utilized by the present invention.

With particular reference to FIG. 1, there is illustrated a building block circuit 10 having first and second inputs and first and second outputs which circuit generates as the first and second outputs the EXCLUSIVE OR function and the logical product, respectively, of the two inputs. The truth table that defines the logical function of circuit 10 is given in table A.

TABLE A

| INPUT | | OUTPUT | |
|---|---|---|---|
| 1 | 2 | 1 | 2 |
| 0 | 0 | 0 | 0 |
| 0 | 1 | 1 | 0 |
| 1 | 0 | 1 | 0 |
| 1 | 1 | 0 | 1 |

Figure 2A:
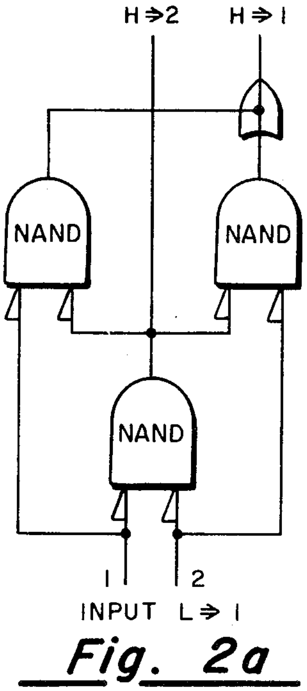
FIGS. 2*a*, 2*b* are logic level drawings of circuits that perform the function of the building block circuit of FIG. 1.
Figure 2B:
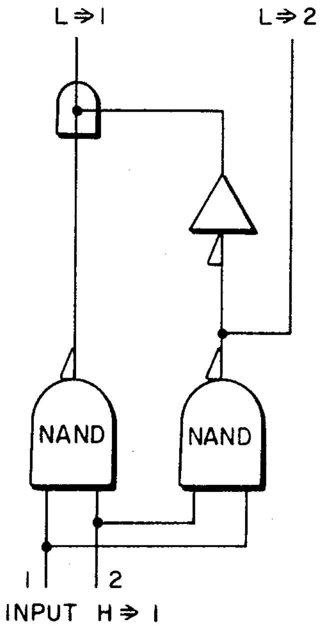

With particular reference to FIGS. 2*a*, 2*b* there are illustrated two circuit configurations capable of generating the logical functions of table A. From table A, it can be seen that output 1 is the EXCLUSIVE OR function of inputs 1 and 2, while output 2 is the logical product of inputs 1 and 2. The present invention involves the intercoupling of a plurality of circuits 10 and one or more logical OR circuits to form a four-bit counter from which, along with additional circuits 10 and OR circuits, counters of $2^n$-bits may be constructed.

The circuit configuration of FIG. 2*a* includes the intercoupling of three NAND circuits and a "wired" OR circuit. In these negative logic NAND circuits the open arrowheads mean that two negative logic inputs, where an input logic "1" is the more negative logic signal level, produce a positive logic output, where an output logic "1" is the more positive logic signal level. Thus, the INPUT L⇒1 implies that if, and only if, only one of the inputs is a negative logic signal level (L⇒1) then the OUTPUT H⇒1 is a more positive logic signal level (H⇒1) while that if, and only if, both of the inputs are a more negative logic signal level (L⇒1) then the output H⇒1 is a more positive signal level (H⇒1); the symbol L⇒1 means that the more negative or lower signal level implies a logic "1," and the symbol H⇒1 means that the more positive or higher signal level implies a logic "1." In the circuit configuration of FIG. 2*b* the same reasoning applies as respect FIG. 2*a*; however, the polarities of both the input and output signals are reversed. In FIG. 2*b* a more positive input signal level is interpreted as a logic "1" (H⇒1) whereas a more negative output signal is interpreted as a logic "1" (L⇒1).

Figure 3:
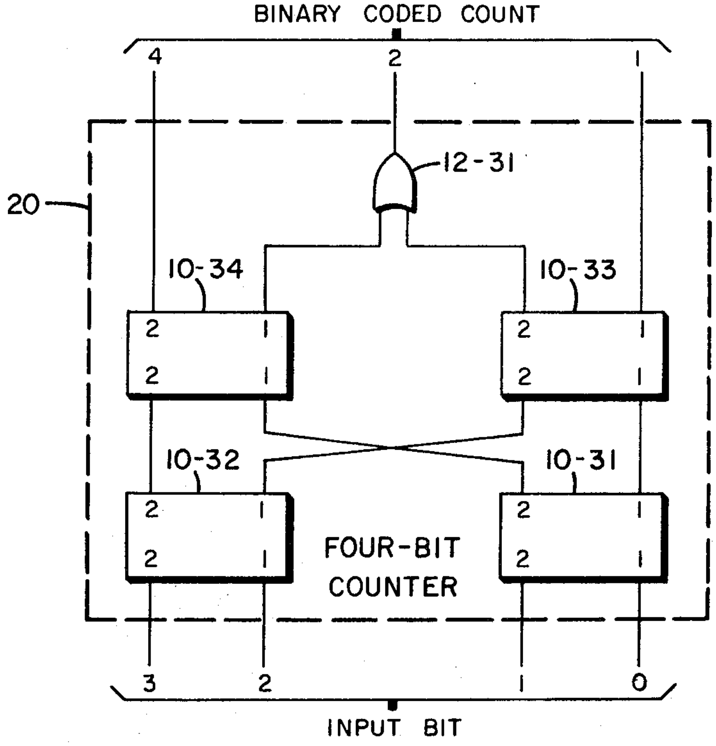
FIG. 3 is an illustration of a four-bit counter incorporating the present invention.

With particular reference to FIG. 3, there is presented an illustration of a four-bit counter 20 which is comprised of four circuits 10 and an OR-circuit 12 intercoupled to provide the logical function defined by the truth table of table B.

TABLE B

| INPUT | | | | OUTPUT | | |
|---|---|---|---|---|---|---|
| 3 | 2 | 1 | 0 | 4 | 2 | 1 |
| 0 | 0 | 0 | 0 | 0 | 0 | 0 |
| 0 | 0 | 0 | 1 | 0 | 0 | 1 |
| 0 | 0 | 1 | 0 | 0 | 0 | 1 |
| 0 | 0 | 1 | 1 | 0 | 1 | 0 |
| 0 | 1 | 0 | 0 | 0 | 0 | 1 |
| 0 | 1 | 0 | 1 | 0 | 1 | 0 |
| 0 | 1 | 1 | 0 | 0 | 1 | 0 |
| 0 | 1 | 1 | 1 | 0 | 1 | 1 |
| 1 | 0 | 0 | 0 | 0 | 0 | 1 |
| 1 | 0 | 0 | 1 | 0 | 1 | 0 |
| 1 | 0 | 1 | 0 | 0 | 1 | 0 |
| 1 | 0 | 1 | 1 | 0 | 1 | 1 |
| 1 | 1 | 0 | 0 | 0 | 1 | 0 |
| 1 | 1 | 0 | 1 | 0 | 1 | 1 |
| 1 | 1 | 1 | 0 | 0 | 1 | 1 |
| 1 | 1 | 1 | 1 | 1 | 0 | 0 |

In the intercoupling format of the four-bit counter 20, which format extends through all $2^n$-bit counter configurations of the present invention, there are two levels of building block logic; a first level consisting of, e.g., first, second circuits 10–31, 10–32, respectively, and a second level consisting of, e.g., third, fourth circuits 10–33, 10–34, respectively. The 1, 2 outputs of the first circuit 10–31 of the first level are coupled to the 1 inputs of the first, second circuits 10–33, 10–34, respectively, of the second level while the 1, 2 outputs of the second circuit 10–32 of the first level are coupled to the 2 inputs of the first, second circuits 10–33, 10–34 respectively, of the second level. Finally, the 2, 1 outputs of contiguous circuits of the second level, e.g., outputs 2, 1 of the first, second circuits 10–33, 10–34, respectively, of the second level are coupled to OR-circuit 12 as 1, 2 inputs, respectively.

Figure 4:
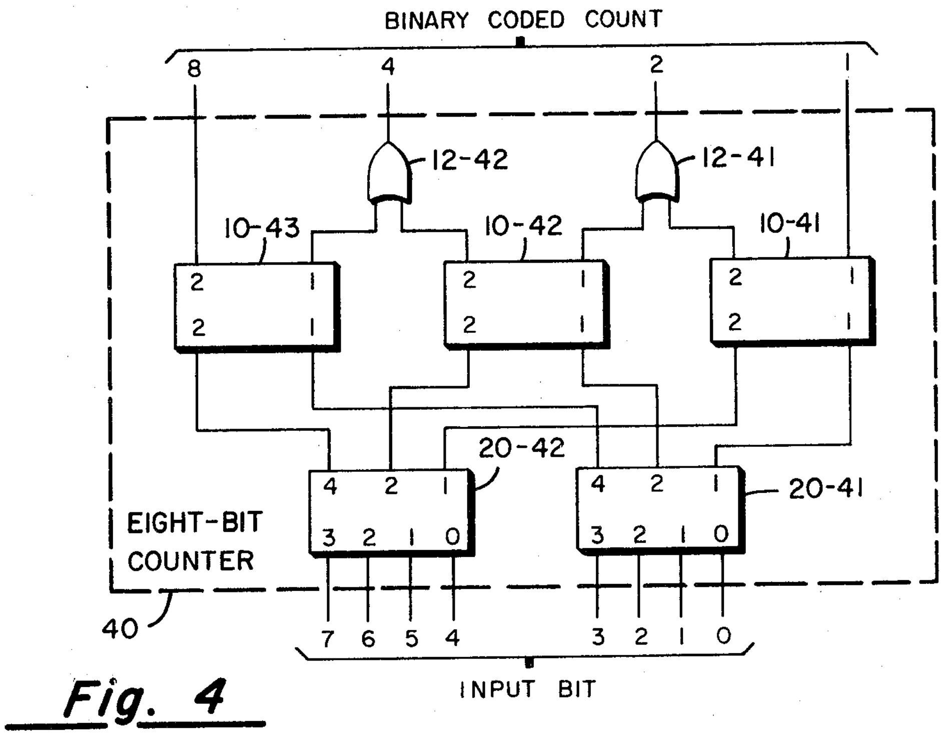
FIG. 4 is an illustration of an eight-bit counter incorporating the present invention.

With particular reference to FIG. 4 there is illustrated an eight-bit counter 40 constructed by the intercoupling of two four-bit counters 20, e.g., four-bit counters 20–41, 20–42, of FIG. 3, three building block circuits 10, e.g., circuits 10–41, 10–42, 10–43, of FIG. 1, and two OR-circuits 12–41, 12–42.

The intercoupling formats of the four-bit counter 20 of FIG. 3 is extended to the eight-bit counter 40 of FIG. 4 wherein there are two levels of building block logic; a first level consisting of, e.g., first, second four-bit counters 20–41, 20–42, respectively, and a second level consisting of, e.g., first, second, third circuits 10–41, 10–42, 10–43, respectively. The 1, 2, 4 outputs of the first four-bit counter 20–41 of the first level are coupled to the 1 inputs of the first, second, third circuits 10–41, 10–42, 10–43, respectively, of the second level, while the 1, 2, 4 outputs of the four-bit counter 20–42 of the first level are coupled to the 2 inputs of the first, second, third circuits 10–41, 10–42, 10–43, respectively, of the second level. Finally, the 2, 1 outputs of the first, second circuits 10–41, 10–42, respectively, of the second level are coupled to a first OR-circuit 12–41 as first, second inputs, respectively, while the 2, 1 outputs of the second, third circuits 10–42, 10–43, respectively, are coupled to the second OR-circuit 12–42 as first, second inputs. The resulting counter is a one-bit-time parallel eight-bit counter providing as output bits the weighted four-bit binary coded sum of the unweighted eight-bit input bits.

Figure 5:
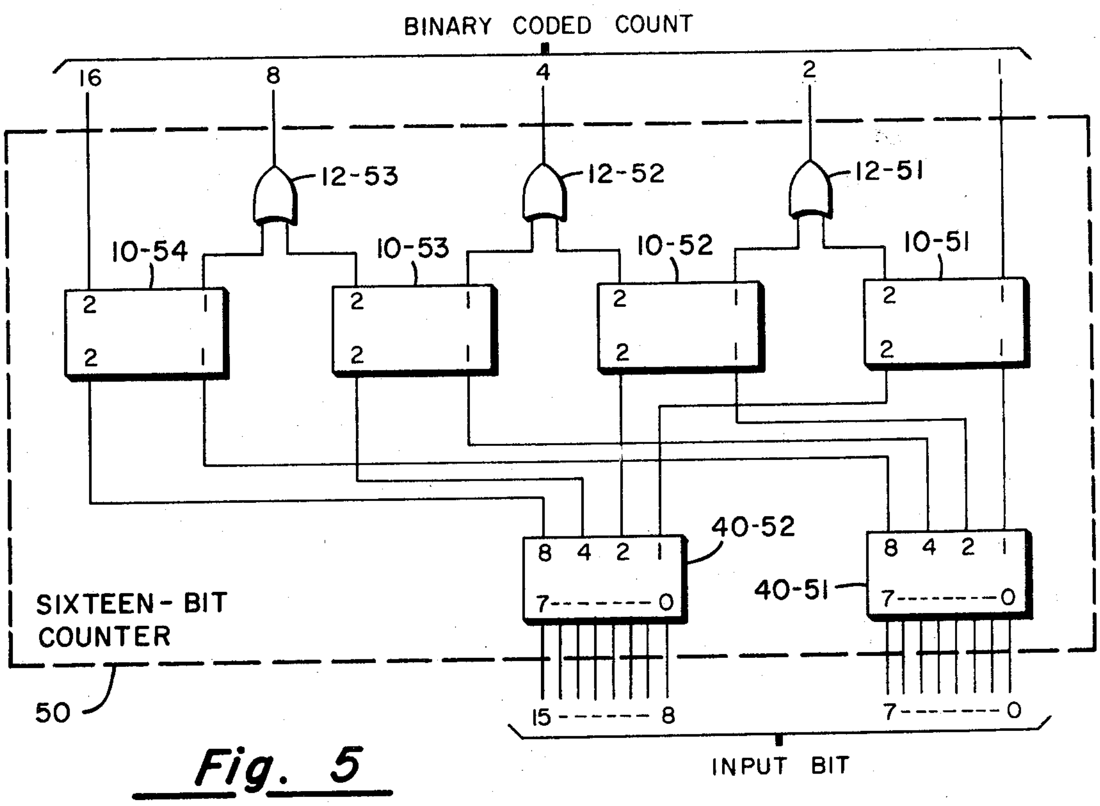
FIG. 5 is an illustration of a 16-bit counter incorporating the present invention.

With particular reference to FIG. 5 there is illustrated a 16-bit counter 50 having as the input thereto the 16 unweighted bits 0–15 and the five weighted bits 1, 2, 4, 8, 16. The intercoupling format of the four-bit counter 20 of FIG. 3 and the eight-bit counter 40 of FIG. 4 is extended to the 16-bit counter 50 of FIG. 5 wherein there are two levels of building block logic; a first level consisting of e.g., first, second eight-bit counters 40–51, 40–52, respectively, and a second level consisting of, e.g., first, second, third, fourth circuits 10–51, 10–52, 10–53, 10–54, respectively. The 1, 2, 4, 8 outputs of the first eight-bit counter 40–51 of the first level are coupled to the 1 inputs of the first, second, third, fourth circuits 10–51, 10–52, 10–53, 10–54, respectively, while the 1, 2, 4, 8 outputs of the second eight-bit counter 40–52 of the first level are coupled to the 2 inputs of the first, second, third, fourth circuits 10–51, 10–52, 10–53, 10–54, respectively, of the second level. Finally, the 2, 1 outputs of contiguous circuits of the second level, e.g., outputs 2, 1 of the first, second circuits 10–51, 10–52, respectively, of the second level are coupled to OR-circuit 12–51 as first, second inputs, respectively; outputs 2, 1 of the second, third circuits 10–52, 10–53, respectively, of the second level are coupled to OR-circuit 12–52 as first, second inputs, respectively; and outputs 2, 1 of the third, fourth circuits 10–53, 10–54, respectively, of the second level are coupled to OR-circuit 12–53 as first, second inputs respectively. The resulting counter is a one-bit-time parallel 16-bit counter providing as output bits the weighted five-bit binary coded sum of the unweighted 16-bit input bits.

Using the above examples of FIGS. 3, 4, 5, it can be seen that the intercoupling format of the present invention permits the generation of binary counters of $2^n$(where $n$ is a positive integer equal to or greater than 2) input bits.

What is claimed is:

1. A four-bit counter, comprising:
first, second, third and fourth building block circuits each including:
1 and 2 inputs;
1 and 2 outputs;
means intercoupling said 1 and 2 inputs and said 1 and 2 outputs for generating the EXCLUSIVE OR function of said 1 and 2 inputs at said 1 output and for generating the logical product of said 1 and 2 inputs at said 2 output;
means coupling the EXCLUSIVE OR output of said first building block circuit to the 1 input of said third building block circuit;
means coupling the EXCLUSIVE OR output of said first building block circuit to the 2 input of said third building block circuit;
means coupling the logical product output of said first building block circuit to the 1 input of said fourth building block circuit;
means coupling the logical product output of said second building block circuit to the 2 input of said fourth building block circuit;
a logical OR circuit;
means coupling the logical product output of said third building block circuit to a first input of said OR circuit;
means coupling the EXCLUSIVE OR output of said fourth building block circuit to a second input of said OR circuit;
the EXCLUSIVE OR output of said third building block circuit, the output of said OR circuit, and the logical product output of said fourth building block circuit generating 1, 2, 4 weighted counts, respectively, of the binary count of the number of significant bits coupled to the inputs of said first and second building block circuits.

2. An eight-bit counter, comprising:
first, second and third building block circuits, each including:
1 and 2 inputs;
1 and 2 outputs;
means intercoupling said 1 and 2 inputs and said 1 and 2 outputs for generating the EXCLUSIVE OR function of said 1 and 2 inputs at said 1 output and for generating the logical product of said 1 and 2 inputs at said 2 output;
first and second four-bit counters defined by claim 2;
means coupling the 1, 2, 4 weighted counts of said first four-bit counter to the 1 inputs of said first, second and third building block circuits, respectively;
first and second logical OR circuits;
means coupling the logical product output of said first building block circuit to a first input of said first OR circuit;
means coupling the EXCLUSIVE OR output of said second building block circuit to a second input of said first OR circuit;
means coupling the logical product output of said second building block circuit to a first input of said second OR circuit
means coupling the EXCLUSIVE OR output of said third building block circuit to a second input of said second OR circuit;
the EXCLUSIVE OR output of said first building block circuit, the outputs of said first and second OR circuit and the logical product output of said third building block circuit generating 1, 2, 4, 8 weighted counts, respectively, of the binary count of the number of significant bits coupled to the inputs of said first and second four-bit counters.

* * * * *

UNITED STATES PATENT OFFICE
CERTIFICATE OF CORRECTION

Patent No. 3,634,658 Dated January 11, 1972

Inventor(s) Richard R. Brown

It is certified that error appears in the above-identified patent and that said Letters Patent are hereby corrected as shown below:

Claim 1
Indent lines 55, 56, 57, 58 of column 3 and lines 1, 2 of column 4 to be subparagraph of paragraph of lines 53, 54 of column 3.

Claim 2
Indent lines 29, 30, 31, 32, 33, 34 of column 4 to be subparagraph of paragraph of lines 27, 28 of column 4.

Column 4, line 6, "first" should read -- second --; line 35, "claim 2" should read -- claim 1 --; line 38, after "respectively;" insert another paragraph as follows:
-- means coupling the 1, 2, 4 weighted counts of said second four-bit counter to the 2 inputs of said first, second and third building block circuits, respectively; --; line 48, after "circuit" insert -- ; --.

Signed and sealed this 21st day of November 1972.

(SEAL)
Attest:

EDWARD M.FLETCHER,JR.
Attesting Officer

ROBERT GOTTSCHALK
Commissioner of Patents